United States Patent
Li

(10) Patent No.: US 9,960,891 B2
(45) Date of Patent: May 1, 2018

(54) INTERFERENCE COORDINATION METHOD IN LTE SYSTEM

(71) Applicant: Huawei Technologies Co., Ltd., Shenzhen, Guangdong (CN)

(72) Inventor: Zhongfeng Li, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 89 days.

(21) Appl. No.: 14/496,817

(22) Filed: Sep. 25, 2014

(65) Prior Publication Data
US 2015/0009944 A1 Jan. 8, 2015

Related U.S. Application Data

(63) Continuation of application No. PCT/CN2012/079346, filed on Jul. 30, 2012.

(51) Int. Cl.
*H04L 5/00* (2006.01)
*H04W 72/08* (2009.01)
(Continued)

(52) U.S. Cl.
CPC .......... *H04L 5/0032* (2013.01); *H04L 5/0094* (2013.01); *H04L 27/2601* (2013.01);
(Continued)

(58) Field of Classification Search
None
See application file for complete search history.

(56) References Cited

U.S. PATENT DOCUMENTS

| 2005/0281189 A1* | 12/2005 | Lee | H04L 5/023 370/208 |
| 2008/0095071 A1* | 4/2008 | Lu | H04W 72/048 370/254 |

(Continued)

FOREIGN PATENT DOCUMENTS

| CN | 101860869 A | 10/2010 |
| CN | 101982991 A | 3/2011 |

(Continued)

OTHER PUBLICATIONS

"Resource priority region for hybrid access mode HeNB", Institute for Information Industry (III), Coiler Corporation, TSG-RAN Working Group 4 (Radio) meeting #52bis, Oct. 12-16, 2009, 11 pages.

(Continued)

*Primary Examiner* — Hicham Foud

(57) ABSTRACT

An interference coordination method in an LTE system includes generating an interference coordination message, where the interference coordination message includes a priority configuration of each resource of multiple resources of a source node device, and a resource with a preset priority in the priority configuration is used to transmit a control channel or a control message. The method also includes sending the interference coordination message to a target node device, so that the target node device performs interference coordination according to the interference coordination message; or sending the interference coordination message to an operation, administration and maintenance network element, so that the operation, administration and maintenance network element configures the interference coordination message for a target node device, so that the target node device performs interference coordination according to the interference coordination message.

14 Claims, 4 Drawing Sheets

(51) Int. Cl.
*H04L 27/26* (2006.01)
*H04W 72/04* (2009.01)
*H04W 72/10* (2009.01)

(52) U.S. Cl.
CPC ....... *H04W 72/042* (2013.01); *H04W 72/082* (2013.01); *H04L 5/0053* (2013.01); *H04L 5/0064* (2013.01); *H04L 5/0073* (2013.01); *H04W 72/10* (2013.01)

(56) References Cited

U.S. PATENT DOCUMENTS

| | | | | |
|---|---|---|---|---|
| 2009/0257381 A1* | 10/2009 | Kuri | ............... | H04B 7/0619 370/329 |
| 2009/0268684 A1* | 10/2009 | Lott | ............... | H04W 72/087 370/329 |
| 2011/0003598 A1* | 1/2011 | Ma | ............... | H04W 72/0426 455/452.1 |
| 2011/0045856 A1 | 2/2011 | Feng et al. | | |
| 2011/0141959 A1* | 6/2011 | Damnjanovic | ....... | H04L 1/1854 370/311 |
| 2011/0312363 A1* | 12/2011 | Kolding | ............... | H04B 7/024 455/513 |
| 2012/0014333 A1* | 1/2012 | Ji | ............... | H04L 5/0032 370/329 |
| 2012/0033570 A1* | 2/2012 | He | ............... | H04L 5/001 370/252 |
| 2012/0099503 A1 | 4/2012 | Guo et al. | | |
| 2012/0099505 A1 | 4/2012 | Wang et al. | | |
| 2012/0100860 A1* | 4/2012 | Lei | ............... | H04W 36/20 455/438 |
| 2013/0051297 A1* | 2/2013 | Kim | ............... | H04W 52/48 370/311 |
| 2013/0058233 A1* | 3/2013 | Kim | ............... | H04L 5/001 370/252 |
| 2013/0114525 A1* | 5/2013 | Ahmadi | ............... | H04L 5/0053 370/329 |
| 2013/0188566 A1* | 7/2013 | Zhu | ............... | H04W 72/042 370/329 |
| 2013/0225217 A1* | 8/2013 | Li | ............... | H04W 72/082 455/501 |
| 2013/0230013 A1* | 9/2013 | Seo | ............... | H04L 27/2602 370/329 |
| 2013/0295949 A1* | 11/2013 | Seo | ............... | H04J 11/005 455/452.1 |
| 2013/0301549 A1* | 11/2013 | Chen | ............... | H04W 76/048 370/329 |
| 2013/0315157 A1* | 11/2013 | Krishnamurthy | ..... | H04L 5/0053 370/329 |
| 2014/0056244 A1* | 2/2014 | Frenne | ............... | H04L 5/0078 370/329 |
| 2014/0073342 A1* | 3/2014 | Lioulis | ............... | H04W 64/00 455/452.2 |
| 2014/0211734 A1* | 7/2014 | Seo | ............... | H04J 11/0056 370/329 |
| 2014/0254531 A1* | 9/2014 | Lee | ............... | H04L 5/006 370/329 |
| 2014/0314042 A1* | 10/2014 | Kim | ............... | H04L 1/0072 370/329 |
| 2015/0078284 A1* | 3/2015 | Lee | ............... | H04W 24/10 370/329 |

FOREIGN PATENT DOCUMENTS

| | | |
|---|---|---|
| CN | 102026390 A | 4/2011 |
| CN | 102149100 A | 8/2011 |
| CN | 102291785 A | 12/2011 |
| CN | 102413499 A | 4/2012 |
| CN | 102573082 A | 7/2012 |
| EP | 2 373 109 A1 | 10/2011 |
| WO | WO 2011/029469 A1 | 3/2011 |
| WO | WO 2012/072097 A1 | 6/2012 |

OTHER PUBLICATIONS

"On multiplexing of PDSCH with enhanced control channels", Ericsson, ST-Ericsson, 3GPP TSG-RAN WG1 #68, Feb. 6-10, 2012, 3 pages.

"Discussion on eREG/eCCE definition", LG Electronics,. 3GPP TSG RAN WG1 Meeting #69, May 21-25, 2012, 7 pages.

\* cited by examiner

INTERFERENCE COORDINATION METHOD IN LTE SYSTEM

CROSS-REFERENCE TO RELATED APPLICATIONS

This application is a continuation of International Application No. PCT/CN2012/079346, filed on Jul. 30, 2012, which is hereby incorporated by reference in its entirety.

TECHNICAL FIELD

The present invention relates to the field of wireless communications, and in particular, to an interference coordination method in an LTE system.

BACKGROUND

LTE is an abbreviation of Long Term Evolution. The LTE is also commonly referred to as 3.9G, which has a data downloading capability of 100 Mbps and is considered as a mainstream technology in evolution from 3G to 4G. The LTE improves and enhances an air access technology in 3G, and uses orthogonal frequency division multiplexing (OFDM) and multiple-input multiple-output (MIMO) as a unique standard for evolution of a wireless network of the LTE. Currently, the LTE evolution is developing from Rel-8, Rel-9, and Rel-10 to Rel-11 and beyond Rel-11. From Rel-8 to Rel-10, basically, a loose-coupling relationship exists between evolved NodeBs (eNB), and limited by a delay of loose-coupling backhaul (backhaul), interference coordination between LTE neighboring cells can only be half-static coordination, and a physical resource block (PRB) is used as a frequency-domain resource granularity.

For example, an LTE system defines an inter-cell interference coordination technology in Rel-8, where two interference coordination methods are defined in uplink (UL). One method is an active interference coordination method using high interference indication (HII), that is, an eNB sends forecasted high or low interference sensitivity of each physical resource block to a target cell, for example, a neighboring eNB; the eNB of the target cell should try to avoid scheduling an edge user equipment (UE) on a resource with high interference. Another method is a passive interference coordination method using a overload indication (OI), that is, an eNB classifies interference, which is high or low, suffered in each physical resource block PRB within a system bandwidth of the eNB, and then sends the classified interference to an eNB of a target cell; and the eNB of the target cell will consider the interference when performing scheduling. An interference coordination method with relative narrowband transmit power (RNTP) is defined for downlink (DL) in LTE. A source eNB sends a message to the eNB of the target cell; and in each PRB, 1 bit is used to indicate whether transmit power of the eNB is lower than a set threshold in the RNTP or indicate that the transmit power is not limited. A target eNB considers this constraint when performing scheduling.

The foregoing interference coordination technology in the prior art has the following disadvantages:

1) Priorities of a control channel and a data channel cannot be differentiated effectively. When the control channel and the data channel share an area of the data channel, for example, when an enhanced/extended physical downlink control channel (ePDCCH) and a PDSCH share an area of the PDSCH, for example, when a control channel with a high priority and a data channel are placed together, resources which are used to transmit the control channel and resources which are used to transmit the data channel cannot be further differentiated according to an existing practice of the system; or when only a resource with a high priority is used to transmit the control channel, effective interference coordination cannot be performed in a data area.

2) An existing interference coordination mechanism can only indicate an interference degree by using a PRB as a granularity. However, when a control channel, for example, an ePDCCH uses a data area, because the control channel can use a part of PRBs, a part of PRBs is either wasted or cannot be scheduled by a neighboring eNB with better channel quality in the resource to a control channel of a neighboring cell for use, which reduces the resource utilization.

SUMMARY

The technical issue to be solved by embodiments of the present invention is to provide an interference coordination method and device, which can achieve interference coordination with higher efficiency and further ensure that a resource used to transmit a control channel or a control message is free from interference.

According to one aspect, an embodiment of the present invention provides an interference coordination method in an LTE system, including:

generating an interference coordination message, where the interference coordination message includes a priority configuration of each resource of multiple resources of a source node device, and a resource with a preset priority in the priority configuration is used to transmit a control channel or a control message; and sending the interference coordination message to a target node device, so that the target node device performs interference coordination according to the interference coordination message; or sending the interference coordination message to an operation, administration and maintenance network element, so that the operation, administration and maintenance network element configures the interference coordination message for a target node device, so that the target node device performs interference coordination according to the interference coordination message.

According to one aspect, an embodiment of the present invention further provides an interference coordination method in an LTE system, including:

generating an interference coordination message, where the interference coordination message includes a priority configuration of each resource of multiple resources of a source node device, and the resource is a physical resource block or a physical resource block pair or a partial physical resource block or a partial physical resource block pair; and sending the interference coordination message to a target node device, so that the target node device performs interference coordination according to the interference coordination message; or sending the interference coordination message to an operation, administration and maintenance network element, so that the operation, administration and maintenance network element configures the interference coordination message for a target node device, so that the target node device performs interference coordination according to the interference coordination message.

According to one aspect, an embodiment of the present invention further provides a source node device for implementing interference coordination in an LTE system, where the source node device includes:

an interference coordination message generating module, configured to generate an interference coordination message, where the interference coordination message includes a priority configuration of each resource of multiple resources of the source node device, and a resource with a preset priority in the priority configuration is used to transmit a control channel or a control message; and an interference coordination message sending module, configured to send the interference coordination message to a target node device, so that the target node device performs interference coordination according to the interference coordination message; or configured to send the interference coordination message to an operation, administration and maintenance network element, so that the operation, administration and maintenance network element configures the interference coordination message for a target node device, so that the target node device performs interference coordination according to the interference coordination message.

According to one aspect, an embodiment of the present invention further provides a source node device for implementing interference coordination in an LTE system, where the node device includes:

an interference coordination message generating module, configured to generate an interference coordination message, where the interference coordination message includes a priority configuration of each resource of multiple resources of the source node device, and the resource is a partial physical resource block or a partial physical resource block pair; and an interference coordination message sending module, configured to send the interference coordination message to a target node device, so that the target node device performs interference coordination according to the interference coordination message; or configured to send the interference coordination message to an operation, administration and maintenance network element, so that the operation, administration and maintenance network element configures the interference coordination message for a target node device, so that the target node device performs interference coordination according to the interference coordination message.

According to one aspect, an embodiment of the present invention further provides an interference coordination method in an LTE system, including:

receiving an interference coordination message, where the interference coordination message includes a priority configuration of each resource of multiple resources of a source node device, and a resource with a preset priority in the priority configuration is used to transmit a control channel or a control message; and performing interference coordination according to the interference coordination message.

According to one aspect, an embodiment of the present invention further provides an interference coordination method in an LTE system, including:

receiving an interference coordination message, where the interference coordination message includes a priority configuration of each resource of multiple resources of a source node device, and the resource is a partial physical resource block or a partial physical resource block pair; and performing interference coordination according to the interference coordination message.

According to one aspect, an embodiment of the present invention further provides a target node device for implementing interference coordination in an LTE system, where the target node device includes:

an interference coordination message receiving module, configured to receive an interference coordination message, where the interference coordination message includes a priority configuration of each resource of multiple resources of a source node device, and a resource with a preset priority in the priority configuration is used to transmit a control channel or a control message; and an interference coordination module, configured to perform interference coordination according to the interference coordination message.

According to one aspect, an embodiment of the present invention further provides a target node device for implementing interference coordination in an LTE system, where the target node device includes:

an interference coordination message receiving module, configured to generate an interference coordination message, where the interference coordination message includes a priority configuration of each resource of multiple resources of a source node device, and the resource is a partial physical resource block or a partial physical resource block pair; and an interference coordination module, configured to perform interference coordination according to the interference coordination message.

The following beneficial effects may be brought about by implementing the embodiments of the present invention: by sending a multi-level priority configuration of a smaller resource of a source node device to a target node device, interference coordination is implemented with higher efficiency, and it is further ensured that a resource used to transmit a control channel or a control message is free from interference.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
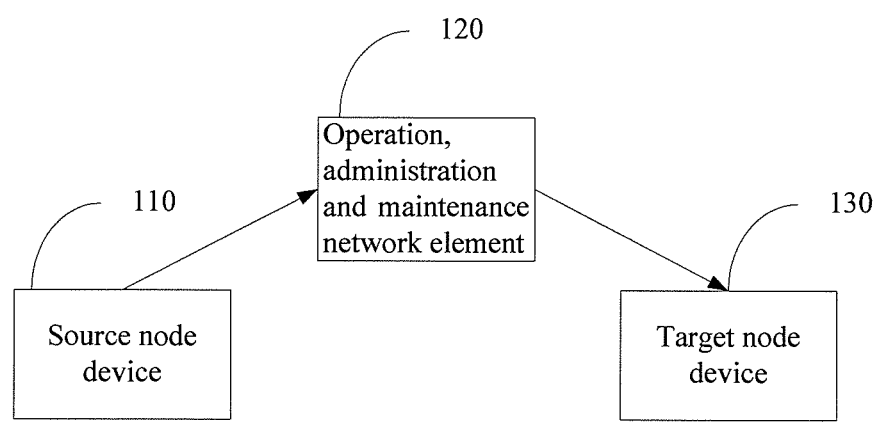
FIG. 1 is a structural diagram of a system that implements a first embodiment of an interference coordination method in an LTE system according to the present invention.
Figure 2:
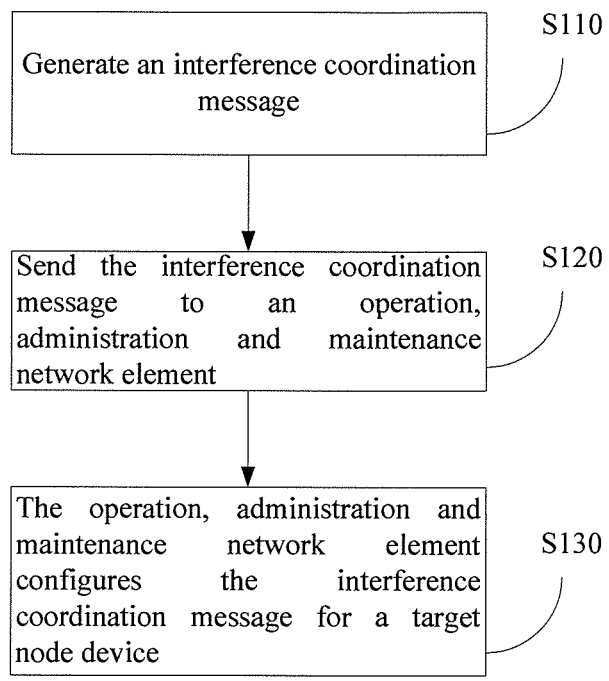
FIG. 2 is a schematic flowchart of a first embodiment of an interference coordination method in an LTE system according to the present invention.

FIG. 1 is a structural diagram of a system that implements a first embodiment of an interference coordination method in an LTE system according to the present invention. In this embodiment, a source node device sends an interference coordination message to an operation, administration and maintenance (OAM) network element, and the OAM configures the interference coordination message for a target node device, so that the target node device performs interference coordination according to the interference coordination message. As shown in FIG. 2, a process of the first embodiment of the interference coordination method in an LTE system according to the present invention includes:

Step S110: Generate an interference coordination message, where the interference coordination message includes a priority configuration of each resource of multiple resources of a source node device. The priority configuration may include at least two or at least three priorities. Specifically, the interference coordination message generated by the source node device may be shown in Table 1 below:

TABLE 1

| Message or field name or group name | Type or value | Range | Description |
|---|---|---|---|
| Cell/node information entry | | 1 to a maximum quantity of cells or nodes served by an eNB | |
| Cell ID or node ID | ECGI | | A source cell ID or a source node ID A target cell ID or a target node ID |
| Resource list | | 1 to a maximum quantity of resources | Each resource corresponds to a position in the list: The first element in the list corresponds to a resource 0, and the second element in the list corresponds to a resource 1, and the like. |
| Priority of each resource | ENUMERATED (high, medium, low) | | The priority of each resource is represented by one of three states. |

When an eNB in which the source node device is located includes only nodes with different cell identifications (ID), the value range of the <cell information entry> is 1 to a maximum quantity of cells served by the eNB; and when the eNB in which the source node device is located includes only nodes with a same cell ID, the value range of the <cell information entry> may be 1 to a maximum quantity of nodes included by the eNB. The <cell ID or node ID> is used to identify a source node device or a target node device of the interference coordination message. If the source node device and the target node device have different cell IDs, the source node device and the target node device belong to different cells. In this case, a physical cell identifier or an evolved universal terrestrial radio access network cell global identifier (ECGI) is used to identify the source node device and the target node device. When the source node device and the target node device have a same cell ID, the source node device and the target node device belong to a same cell. In this case, the ECGI may be used to identify the source node device and the target node device. Optionally, in other embodiments, the <cell ID or node ID> may include only a cell ID or a node ID of the target node device.

In the <priority of each resource>, that different bit values correspond to different priorities is used to illustrate a priority of each resource of multiple resources of the source node device. In the present invention, the resource may be a resource granularity, may be a subframe in a time domain or an aggregation of several subframes, may be a physical resource block or a physical resource block pair, may be a partial physical resource block or a partial physical resource block pair, or may be a combination of the foregoing time-domain resource and frequency-domain resource. The partial physical resource block is a part of the physical resource block, and may be a part of one extended control channel element or a part of an aggregation of at least two extended control channel elements; and the partial physical resource block pair is a part of the physical resource block pair, and may be one extended control channel element or an aggregation of at least two extended control channel elements. One extended control channel element is a smallest resource for transmitting an ePDCCH. A resource block (RB) mentioned in this specification is used to describe a mapping from a physical channel to a resource element (RE). A physical resource block is formed by a certain quantity x of successive OFDM symbols in a time domain and a certain quantity y of successive subcarriers in a frequency domain. Therefore, a physical resource block is formed by x*y resource elements, which correspondingly is a time slot in the time domain and 180 kHz in the frequency domain. Each resource element may be identified by an antenna port, an OFDM symbol, and a subcarrier. In the LTE system, for a normal cyclic prefix (CP), one RB is formed by 7 OFDM symbols and 12 subcarriers; and for an extended CP, one RB is formed by 6 OFDM symbols and 12 subcarriers or is formed by 3 OFDM symbols and 24 subcarriers. One physical resource block pair (PRB pair) is formed by resource blocks of 2 time slots, where the resources blocks of 2 time slots may correspond to a same resource block number. During a specific implementation, the <priority of each resource> may be represented by using a bitmap below:

TABLE 2

| Priority of each resource | BIT STRING (2S*M/n . . .) | Every two bits in the bitmap correspond to one physical resource (for example, the first bit and the second bit correspond to a resource 0, and the rest may be deduced by analog), and four states 00, 01, 10, and 11 of every two bits separately represent a priority configuration of the resource corresponding to the bits. |
|---|---|---|

Table 2 shows a bitmap of each partial physical resource block obtained through division, that is, each physical resource, where a bandwidth S may be a preset system bandwidth, for example, 6 PRBs, 10 PRBs, 25 PRBs, 50 PRBs or 110 PRBs, and may also be another bandwidth configured for the interference coordination; M is the quantity of enhanced/extended control channel elements (eCCE) included in each PRB or each PRB pair, n is the quantity of eCCEs included in each physical resource divided in the source node device. For example, if the source node device includes three physical resources, every two bits of six bits in the bitmap represent a priority configuration of the three physical resources, which may be specifically as follows: 00 represents a first priority, 01 represents a second priority, 10 represents a third priority, and 11 is a reserved bit.

The interference coordination message in this embodiment of the present invention may indicate that a resource with a preset priority in the priority configuration is used to transmit a control channel or control message (may also be used to transmit another channel or another signal simultaneously), where the preset priority may specifically be the first priority or the highest priority. For example, the preset priority shown in the foregoing Table 2 may be the first priority 00, of which a corresponding physical resource is used to transmit a control channel or control message, and physical resources of other priorities may be used to transmit a data channel. The control channel may be the ePDCCH, and the control message may be a message borne by a broadcast channel (PBCH) or system information (SI) or a paging message or an random access channel (RACH) response message borne in a PDSCH, where the RACH response message is indicated by a PDCCH or an ePDCCH that has been scrambled by random access-radio network temporary identifier (RA-RNTI) or Temporary C-RNTI (temporary cell identifier) scrambling. In other embodiments, only one bit may be used to correspond to one physical resource, for example, 0 indicates the first priority, and 1 indicates the second priority. In this case, the bitmap is represented as BIT STRING (S*M/n . . . ). When the resource is a time-domain subframe or a subframe aggregation, the implementation manner is similar to the manner of the foregoing physical resource, and every 1 or 2 bits in the bitmap is used to indicate a priority configuration of each subframe or each subframe aggregation obtained through division, which is not further described herein.

Further, the interference coordination message further includes a power configuration of at least partial resources of multiple resources of the source node device. Still using the physical resource as an example, a specific implementation manner may be as follows: 1) In the <priority of each resource>, only one bit is used to correspond to a priority of each physical resource, 0 indicates the first priority, and 1 indicates the second priority. In addition, the interference coordination message further includes an indication used to identify relative narrowband transmit power (RNTP) of each physical resource, which also uses one bit to identify whether transmit power of each physical resource exceeds an RNTP threshold, for example, 0 indicates that transmit power of a corresponding physical resource does not exceed a set RNTP threshold, and 1 indicates that the transmit power of the physical resource is not limited. 2) In the <priority of each physical resource>, two bits are used to indicate a priority of each physical resource, different symbols may correspond to a same priority and a same RNTP transmit power limitation or different RNTP transmit power limitations, as shown in Table 3 below:

TABLE 3

| Priority of each resource | ENUMERATED (unlimited transmit power 1, unlimited transmit power 2, and limited transmit power) | The priority of each resource is represented by one of three states. The unlimited transmit power has a higher priority compared with the limited transmit power. The unlimited transmit power 1 may have a higher priority than the unlimited transmit power 2. A limited power value of the transmit power may be indicated by an RNTP field. |
|---|---|---|

For example, 00 is used to indicate the first priority, 01 indicates the second priority and that the transmit power is not limited by the RNTP threshold, 10 indicates the second priority but that the transmit power does not exceed the RNTP threshold, and 11 is still a reserved bit; or, 00 is used to indicate the first priority and that the transmit power is not limited, 01 indicates the second priority and that the transmit power is not limited, 10 indicates the third priority and the transmit power does not exceed the RNTP threshold, and 11 indicates a fourth priority and that the transmit power does not exceed the RNTP threshold.

Further, the interference coordination message further includes a configuration of a resource used by the source node device to send a system message or a paging message. To prevent a system message or a paging message between nodes from suffering interference from adjacent channel leakage, the source node device may add, to the interference coordination message, a time-domain and/or frequency-domain resource configuration that is used by the source node device to send a system message, or a paging message or an RACH response message or indicates that the target node device sends a system message or a paging message or an RACH response message. Specifically, the indication may also use the bitmap method. Table 4 and Table 5 below show a time-domain and/or frequency-domain resource configuration indicating that a system message or a paging message or an RACH response message is sent in an frequency division duplex (FDD) system and in a time division duplex (TDD) system separately:

TABLE 4

| In an FDD system | | |
|---|---|---|
| Message name or field name | Type or value | Description |
| System message or paging message subframe or RACH response message | BIT STRING (SIZE (40)) | Each bit of the bitmap represents a downlink subframe. 1 indicates that a system message or a paging message or an RACH response message is transmitted in the subframe, and 0 indicates the system message or the paging message or the RACH response message is not transmitted in the subframe. The first bit of the bitmap corresponds to a subframe 0. A 40-bit bitmap |

TABLE 4-continued

In an FDD system

| Message name or field name | Type or value | Description |
|---|---|---|
| | | corresponds to a total of 40 subframes of 4 successive frames. The maximum quantity of subframes is 40. |
| System message or paging message frequency-domain resource or RACH response message | BIT STRING (S*M/n) | Each bit of the bitmap represents a physical resource. 1 indicates that a system message or a paging message or an RACH response message is transmitted on the physical resource, and 0 indicates the system message or the paging message or the RACH response message is not transmitted on the physical resource. |

TABLE 5

In a TDD system

| Message name or field name | Type or value | Description |
|---|---|---|
| System message or paging message subframe or RACH response message | BIT STRING (SIZE (70)) | Each bit of the bitmap represents a downlink subframe and/or an S subframe. 1 indicates that a system message or a paging message or an RACH response message is transmitted in the subframe, and 0 indicates the system message or the paging message or the RACH response message is not transmitted in the subframe. The first bit of the bitmap corresponds to a subframe 0. The maximum quantity of subframes depends on a UL/DL subframe configuration. For UL/DL configurations 1 to 5, the maximum quantity of subframes is 20; for UL/DL configuration 6, the maximum quantity of subframes is 60; and for UL/DL configuration 0, the maximum quantity of subframes is 70. A 70-bit bitmap corresponds to a total of 70 subframes of 7 successive frames. |
| System message or paging message frequency-domain resource or RACH response message | BIT STRING (S*M/n) | Each bit of the bitmap represents a physical resource granularity. 1 indicates that a system message or a paging message or an RACH response message is transmitted on the physical resource, and 0 indicates the system message or the paging message or the RACH response message is not transmitted on the physical resource. |

Optionally, the <priority of each resource> in Table 1 may also be used to represent a resource used to transmit a system message or a paging message or an RACH response message, that is, a physical resource with a preset priority is used to transmit a system message or a paging message or an RACH response message.

Step S120: Send the interference coordination message to an operation, administration and maintenance network element.

Further, the source node device may further send a start OFDM symbol of an ePDCCH of the source node device or the target node device to the OAM network element. During a specific implementation, a message or a field may be defined, as shown in Table 6 below.

TABLE 6

| Message name or field name | Type or value | Description |
|---|---|---|
| ePDCCH start symbol | INTEGER (0~4) INTEGER (0 to 4) | Value 0 indicates that the ePDCCH starts from an OFDM symbol 0; and value 1 indicates that the ePDCCH starts from an OFDM symbol 1. The rest may be deduced by analog. |

A carrier index may also be sent to the OAM. As shown in Table 7 below, a mapping between a carrier index value and a carrier frequency is carried in a system message from the source node device to the OAM.

TABLE 7

| Message name or field name | Type or value | Description |
|---|---|---|
| Cell index | INTEGER (0 . . . 7) | A carrier index value |
| ePDCCH start symbol | INTEGER (0 . . . 4) | An ePDCCH start OFDM symbol. Value 0 indicates that the ePDCCH starts from an OFDM symbol 0; and value 1 indicates that the ePDCCH starts from an OFDM symbol 1. Another value is similar. |

Step S130: The operation, administration and maintenance network element configures the interference coordination message for the target node device, so that the target node device performs interference coordination according to the interference coordination message. During a specific implementation, the OAM may directly configure, for the target node device, the interference coordination message that is acquired from the source node device; or, the OAM may first perform information processing on the acquired interference coordination message, and then configure the processed interference coordination message for the target node device. After receiving the interference coordination message, the target node device configures, corresponding to a priority of a resource of the source node device and in the interference coordination message, transmit power, a priority, and the like of a resource of the target node device. For example, for a resource with the highest priority of the source node device, the target node device reserves and does not use a resource which has a same frequency or a same time domain as the source node device; if the resource is already used, the target node device replaces the resource with another resource, and even reserves a certain protection frequency band; for a resource with the second highest priority of the source node device, the target node device may reduce transmit power of a resource which has a same frequency or a same time domain as the source node device or set the resource to a low priority; for a resource with a low priority of the source node device, the target node device may use a resource which has a same frequency or a same time domain as the source node device to transmit a control channel or a control message or set the resource to a high priority, or the like, so as to reduce interference to a neighboring cell of the source node device. Further, the target node device may further skip sending a channel or a signal on the resource according to the time-domain and/or frequency-domain resource configuration used to send a system message or a paging message or an RACH response message and in the interference coordination message; or send a system message or a paging message or an RACH response message on the resource according to an indication.

If the OAM further receives a start OFDM symbol of the ePDCCH, of the source node device or the target node device, sent by the source node device, the OAM sends the start OFDM symbol of the ePDCCH of the source node device or a start OFDM symbol of the ePDCCH that should be configured by the target node device to the target node device; the target node device performs interference coordination according to the start OFDM symbol of the ePDCCH of the source node device or the start OFDM symbol of the ePDCCH that should be configured by the target node device and notified by the source node device, including selecting an end OFDM symbol of a PDCCH of the target node device or a start OFDM symbol of the ePDCCH of the target node device according to the start OFDM symbol of the ePDCCH of the source node device, and setting the end OFDM symbol of the PDCCH of the target node device or the start OFDM symbol of the ePDCCH of the target node device according to the start OFDM symbol of the ePDCCH that should be configured by the target node device and notified by the source node device, so as to avoid causing interference to a PDCCH of the source node device or suffering interference from the PDCCH of the source node device.

Figure 3:
FIG. 3 is a structural diagram of a system that implements a second embodiment of an interference coordination method in an LTE system according to the present invention.
Figure 4:
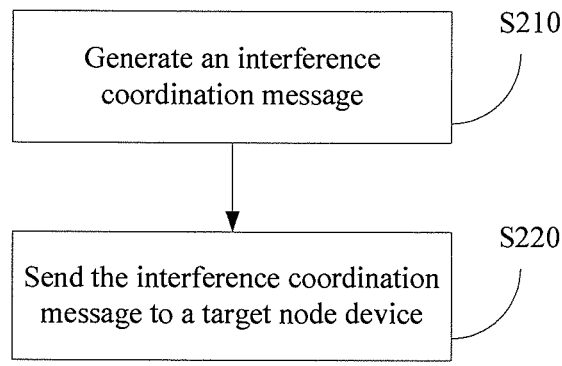
FIG. 4 is a schematic flowchart of a second embodiment of an interference coordination method in an LTE system according to the present invention.

FIG. 3 is a structural diagram of a system that implements a second embodiment of an interference coordination method in an LTE system according to the present invention. In this embodiment, a source node device sends an interference coordination message to a target node device directly, so that a target node device performs interference coordination according to the interference coordination message. As shown in FIG. 4, a process of the second embodiment of the interference coordination method in an LTE system according to the present invention includes:

Step S210: Generate an interference coordination message. This step is the same as step S110 in the first embodiment, which is not further described herein.

Step S220: Send the interference coordination message to a target node device. After receiving the interference coordination message, the target node device configures, corresponding to a priority of a resource of the source node device and in the interference coordination message, transmit power, a priority, and the like of a resource of the target node device, for example, for a resource with the highest priority of the source node device, the target node device reserves and does not use a resource which has a same frequency domain or a same time domain as the source node device; if the resource is already used, the target node device replaces the resource with another resource, and even reserves a certain protection frequency band; for a resource with the second highest priority of the source node device, the target node device may reduce transmit power of a resource which has a same frequency domain or a same time domain as the source node device; for a resource with a low priority of the source node device, the target node device may use a resource which has a same frequency domain or a same time domain as the source node device to transmit a control channel or a control message or set the resource to a high priority, or the like, so as to reduce interference to a neighboring cell of the source node device. Further, the target node device may further skip sending a channel or a signal on the resource according to the time-domain and/or frequency-domain resource configuration used to send a system message or a paging message or an RACH response message and in the interference coordination message; or send a system message or a paging message or an RACH response message on the resource according to an indication.

Further, the source node device may further send a start OFDM symbol of an ePDCCH of the source node device or the target node device to the target node device. The specific implementation manner is the same as that in the first embodiment. The start OFDM symbol may be sent to the target node device by defining a message or a field individually, and may also be sent, together with a carrier index, to the target node device. The target node device modulates an end OFDM symbol of a PDCCH of the target node device or the start OFDM symbol of the ePDCCH of the target node device according to the start OFDM symbol of the ePDCCH of the source device or the target node device, so as to avoid causing interference to a PDCCH of the source node device or suffering interference from the PDCCH of the source node device.

Figure 5:
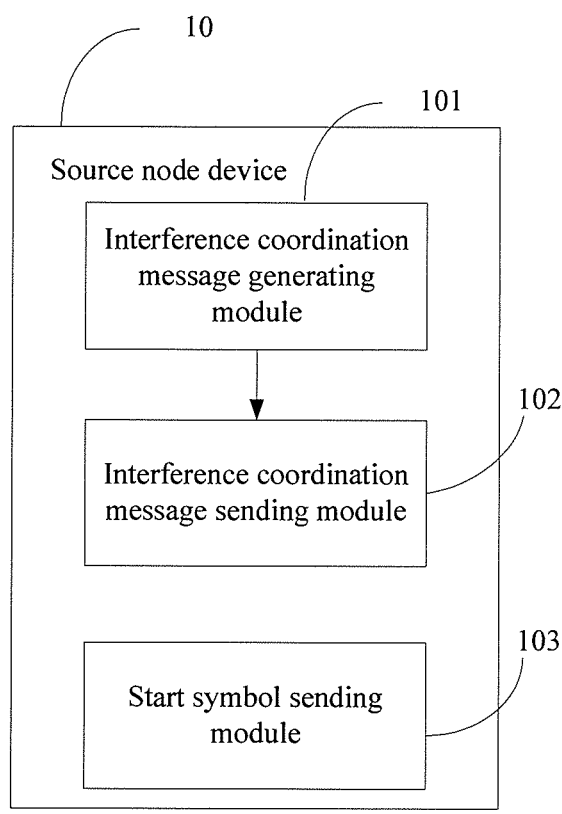
FIG. 5 is a schematic structural diagram of a source node device for implementing interference coordination according to an embodiment of the present invention.

FIG. 5 is a schematic structural diagram of a source node device for implementing interference coordination according to an embodiment of the present invention. As shown in the figure, the source node device for implementing interference coordination according to this embodiment of the present invention may at least include:

An interference coordination message generating module 101 is configured to generate an interference coordination message, where the interference coordination message includes a priority configuration of each resource of multiple resources of the source node device. The priority configuration may include at least two or at least three priorities. Specifically, the interference coordination message generated by the interference coordination message generating module may be shown in Table 8 below:

TABLE 8

| Message or field name or group name | Type or value | Range | Description |
|---|---|---|---|
| Cell/node information entry | | 1 to a maximum quantity of cells or nodes served by an eNB | |
| Cell ID or node ID | ECGI | | A source cell ID or a source node ID A target cell ID or a target node ID |
| Resource list | | 1 to a maximum quantity of resources | Each resource corresponds to a position in the list: The first element in the list corresponds to a resource 0, and the second element in the list corresponds to a resource 1, and the like. |

TABLE 8-continued

| Message or field name or group name | Type or value | Range | Description |
|---|---|---|---|
| Priority of each resource | ENUMERATED (high, medium, low) | | The priority of each resource is represented by one of three states. |

When an eNB in which the source node device is located includes only nodes with different cell IDs, the value range of the <cell information entry> is 1 to a maximum quantity of cells served by the eNB; when the eNB in which the source node device is located includes only nodes with a same cell ID, the value range of the <cell information entry> may be 1 to a maximum quantity of nodes included by the eNB. The <cell ID or node ID> is used to identify a source node device or a target node device of the interference coordination message. If the source node device and the target node device have different cell IDs, the source node device and the target node device belong to different cells. In this case, a physical cell identifier or an ECGI is used to identify the source node device and the target node device. When the source node device and the target node device have a same cell ID, the source node device and the target node device belong to a same cell. In this case, the ECGI must be used to identify the source node device and the target node device.

In the <priority of each resource>, that different bit values correspond to different priorities is used to illustrate a priority of each resource of multiple resources of the source node device. In the present invention, the resource may be a resource granularity, may be a subframe in a time domain or an aggregation of several subframes, may be a physical resource block or a physical resource block pair, may be a partial physical resource block or a partial physical resource block pair, or may be a combination of the foregoing time-domain resource and frequency-domain resource. The partial physical resource block is a part of the physical resource block, and may further be a part of one extended control channel element or a part of an aggregation of at least two extended control channel elements; and the partial physical resource block pair is a part of the physical resource block pair, and may further be one extended control channel element or an aggregation of at least two extended control channel elements. During a specific implementation, the <priority of each resource> may be represented by using a bitmap shown in Table 9 below:

TABLE 9

| Priority of each resource | BIT STRING (2S*M/n . . .) | Every two bits in the bitmap correspond to one physical resource (for example, the first bit and the second bit correspond to a resource 0, and the rest may be deduced by analog), and four states 00, 01, 10, and 11 of every two bits separately represent a priority configuration of the resource corresponding to the bits. |
|---|---|---|

Table 9 shows a bitmap of each partial physical resource block obtained through division, that is, each physical resource, where a bandwidth S may be a preset system bandwidth, for example, 6 PRBs, 10 PRBs, 25 PRBs, 50 PRBs or 110 PRBs, and may also be another bandwidth configured for the interference coordination; M is the quantity of eCCEs included in each PRB or each PRB pair, n is the quantity of eCCEs included in each physical resource divided in the source node device. For example, if the source node device includes three physical resources, every two bits of six bits in the bitmap represent a priority configuration of the three physical resources, which may be specifically as follows: 00 represents a first priority, 01 represents a second priority, 10 represents a third priority, and 11 is a reserved bit.

The interference coordination message in this embodiment of the present invention may indicate that a resource with a preset priority in the priority configuration is used to transmit a control channel or control message (may also be used to transmit another channel or another signal simultaneously), where the preset priority may specifically be the first priority or the highest priority. For example, the preset priority shown in the foregoing Table 9 may be the first priority 00, of which a corresponding physical resource is used to transmit a control channel or control information, and physical resources of other priorities may be used to transmit a data channel. The control channel may be an ePDCCH, and the control message may be a broadcast channel or a system message or an RACH response message borne in a PDSCH. In other embodiments, only one bit may be used to correspond to one physical resource, for example, 0 indicates the first priority, and 1 indicates the second priority. In this case, the bitmap is represented as BIT STRING (S*M/n . . . ). When the resource is a time-domain subframe or a subframe aggregation, the implementation manner is similar to the manner of the foregoing physical resource, and every 1 or 2 bits in the bitmap is used to indicate a priority configuration of each subframe or each subframe aggregation obtained through division, which is not further described herein.

Further, the interference coordination message further includes a power configuration of at least partial resources of multiple resources of the source node device. Still using the physical resource as an example, a specific implementation manner may be as follows: 1) In the <priority of each resource>, only one bit is used to correspond to a priority of each physical resource, 0 indicates the first priority, and 1 indicates the second priority. In addition, the interference coordination message further includes an indication used to identify RNTP of each physical resource, which also uses one bit to identify whether transmit power of each physical resource exceeds an RNTP threshold, for example, 0 indicates that transmit power of a corresponding physical resource does not exceed a set RNTP threshold, and 1 indicates that the transmit power of the physical resource is not limited. 2) In the <priority of each physical resource>, two bits are used to indicate a priority of each physical resource, different symbols may correspond to a same priority and a same RNTP transmit power limitation or different RNTP transmit power limitations, as shown in Table 10 below:

TABLE 10

| Priority of each resource | ENUMERATED (unlimited transmit power 1, unlimited transmit power 2, and limited transmit power) | The priority of each resource is represented by one of three states. The unlimited transmit power has a higher priority compared with the limited transmit power. The unlimited transmit power 1 may have a higher priority than the unlimited transmit power 2. A limited power value of the transmit power may be indicated by an RNTP field. |
|---|---|---|

For example, 00 is used to indicate the first priority, 01 indicates the second priority and that the transmit power is not limited by the RNTP threshold, 10 indicates the second priority but that the transmit power does not exceed the RNTP threshold, and 11 is still a reserved bit; or, 00 is used to indicate the first priority and that the transmit power is not limited, 01 indicates the second priority and that the transmit power is not limited, 10 indicates the third priority and the transmit power does not exceed the RNTP threshold, and 11 indicates a fourth priority and that the transmit power does not exceed the RNTP threshold.

Further, the interference coordination message further includes a configuration of a resource used by the source node device to send a system message or a paging message or an RACH response message. To prevent a system message or a paging message or an RACH response message between nodes from suffering interference from adjacent channel leakage, the source node device may add, to the interference coordination message, a time-domain and/or frequency-domain resource configuration that is used by the source node device to send a system message, or a paging message or an RACH response message or indicates that the target node device sends a system message, or a paging message or an RACH response message. Specifically, the indication may also use the bitmap method. Table 11 and Table 12 below show a time-domain and/or frequency-domain resource configuration indicating that a system message or a paging message or an RACH response message is sent in an FDD system and in a TDD system separately:

TABLE 11

In an FDD system

| Message name or field name | Type or value | Description |
|---|---|---|
| System message or paging message subframe or RACH response message subframe | BIT STRING (SIZE (40)) | Each bit of the bitmap represents a downlink subframe. 1 indicates that a system message or a paging message or an RACH response message is transmitted in the subframe, and 0 indicates the system message or the paging message or the RACH response message is not transmitted in the subframe. The first bit of the bitmap corresponds to a subframe 0. A 40-bit bitmap corresponds to a total of 40 subframes of 4 successive frames. The maximum quantity of subframes is 40. |
| System message or paging message or RACH response message frequency-domain resource | BIT STRING (S*M/n) | Each bit of the bitmap represents a physical resource. 1 indicates that a system message or a paging message or an RACH response message is transmitted on the physical resource, and 0 indicates the system message or the paging message or the RACH response message is not transmitted on the physical resource. |

TABLE 12

In a TDD system

| Message name or field name | Type or value | Description |
|---|---|---|
| System message or paging message subframe or RACH response message subframe | BIT STRING (SIZE (70)) | Each bit of the bitmap represents a downlink subframe and/or an S subframe. 1 indicates that a system message or a paging message or an RACH response message is transmitted in the subframe, and 0 indicates the system message or the paging message or the RACH response message is not transmitted in the subframe. The first bit of the bitmap corresponds to a subframe 0. The maximum quantity of subframes depends on a UL/DL subframe configuration. For UL/DL configurations 1 to 5, the maximum quantity of subframes is 20; for UL/DL configuration 6, the maximum quantity of subframes is 60; and for UL/DL configuration 0, the maximum quantity of subframes is 70. A 70-bit bitmap corresponds to a total of 70 subframes of 7 successive frames. |
| System message or paging message or RACH response message frequency-domain resource | BIT STRING (S*M/n) | Each bit of the bitmap represents a physical resource. 1 indicates that a system message or a paging message or an RACH response message is transmitted on the physical resource, and 0 indicates the system message or the paging message or the RACH response message is not transmitted on the physical resource. |

Optionally, the <priority of each resource> in Table 6 may also be used to represent a resource used to transmit a system message or a paging message or an RACH response message, that is, a physical resource with a preset priority is used to transmit a system message or a paging message. It may be understood that this solution may also be implemented by sending only a configuration of a time-domain resource or sending only a frequency-domain resource to the target node device. For example, according to a priority configuration, only a time-domain resource configuration used to send a system message or a paging message or an RACH response message may be sent to the target node, so that the target node device can know, according to a resource with a preset priority in the frequency domain, a resource used by the source node device to transmit a system message or a paging message or an RACH response message.

An interference coordination message sending module 102 is configured to send the interference coordination message to a target node device, so that the target node device performs interference coordination according to the interference coordination message; or configured to send the interference coordination message to an operation, administration and maintenance network element, so that the operation, administration and maintenance network element configures the interference coordination message for the target node device, so that the target node device performs interference coordination according to the interference coordination message. During a specific implementation, the OAM may directly configure, for the target node device, the interference coordination message that is acquired from the source node device; or, the OAM may first perform information processing on the acquired interference coordination message, and then configures the processed interference coordination message for the target node device.

Further, the source node device may further include: a start symbol sending module 103, configured to send a start orthogonal frequency division multiplexing symbol of an extended physical downlink control channel of the source node device or the target node device to the target node device, so that the target node device performs interference coordination according to the interference coordination message and the start orthogonal frequency division multiplexing symbol of the extended physical downlink control channel; or configured to send a start orthogonal frequency division multiplexing symbol of an extended physical downlink control channel of the source node device or the target node device to an operation, administration and maintenance network element, so that the operation, administration and maintenance network element configures the start orthogonal frequency division multiplexing symbol of the extended physical downlink control channel of the source node device or the target node device for the target node device, so that the target node device performs interference coordination according to the interference coordination message and the start orthogonal frequency division multiplexing symbol of the extended physical downlink control channel. During a specific implementation, the symbol sending module 103 may send the start OFDM symbol of the ePDCCH of the source node device or the target node device by defining a message or a field, as shown in Table 13 below.

TABLE 13

| Message name or field name | Type or value | Description |
| --- | --- | --- |
| ePDCCH start symbol | INTEGER (0 to 4) | Value 0 indicates that the ePDCCH starts from an OFDM symbol 0; and value 1 indicates that the ePDCCH starts from an OFDM symbol 1. The rest may be deduced by analog. |

The start symbol sending module 103 may also send a carrier index to the OAM. As shown in Table 14 below, a mapping between a carrier index value and a carrier frequency may be carried in a system message from the source node device to the OAM.

TABLE 14

| Message name or field name | Type or value | Description |
| --- | --- | --- |
| Cell index | INTEGER (0 . . . 7) | A carrier index value |
| ePDCCH start symbol | INTEGER (0 . . . 4) | An ePDCCH start OFDM symbol. Value 0 indicates that the ePDCCH starts from an OFDM symbol 0; and value 1 indicates that the ePDCCH starts from an OFDM symbol 1. Another value is similar. |

Figure 6:
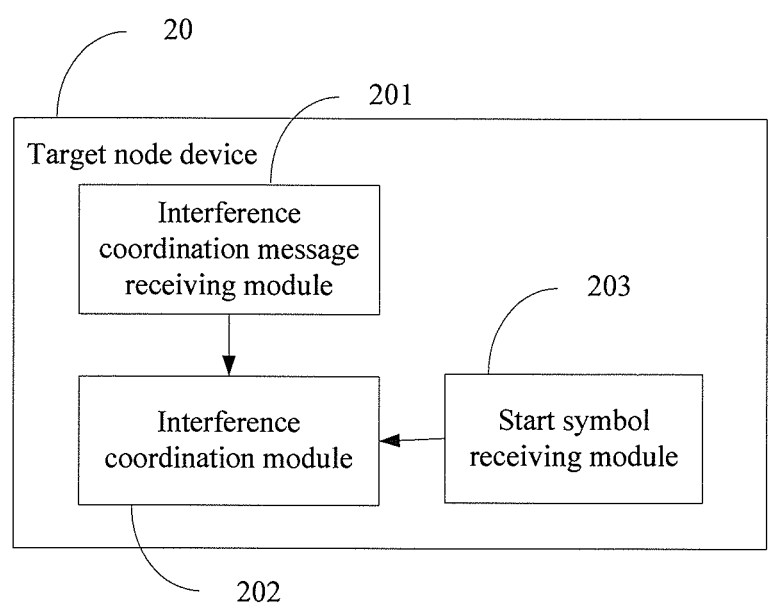
FIG. 6 is a schematic structural diagram of a target node device for implementing interference coordination according to an embodiment of the present invention.

FIG. 6 is a schematic structural diagram of a target node device for implementing interference coordination according to an embodiment of the present invention. As show in FIG. 6, the target node device of the present invention may at least include:

An interference coordination message receiving module 201 is configured to receive an interference coordination message. During a specific implementation, the receiving an interference coordination message is receiving the interference coordination message from a source node device or receiving the interference coordination message from an operation, administration and maintenance network element. The OAM may directly configure, for a target node device, the interference coordination message that is acquired from the source node device; or, the OAM may first perform information processing on the acquired interference coordination message, and then configures the processed interference coordination message for the target node device. Content included in the interference coordination message is similar to that in the interference coordination message acquired by the foregoing interference coordination message generating module 101, which is not further described herein.

An interference coordination module 202 is configured to perform interference coordination according to the interference coordination message. During a specific implementation, after receiving the interference coordination message, the interference coordination module 202 configures, corresponding to a priority of a resource of the source node device and in the interference coordination message, transmit power, a priority, and the like of a resource of the interference coordination module 202, for example, for a resource with the highest priority of the source node device, the interference coordination module 202 reserves and does not use resources in a same frequency domain or in a same time domain of the target node device; if the resources are already used, the interference coordination module 202 replaces the resources with other resources, and even reserves a certain protection frequency band; for a resource with the second highest priority of the source node device, the interference coordination module 202 may reduce transmit power of resources in a same frequency domain or in a same time domain of the target node device; for a resource with a low priority of the source node device, the interference coordination module 202 may use resources in a same frequency domain or in a same time domain of the target node device to transmit a control channel or a control message or set the resources to a high priority, or the like, so as to reduce interference to a neighboring cell of the source node device.

Further, that the interference coordination module 202 perform interference coordination according to the interference coordination message may further include: skipping sending a channel or a signal on the resource according to the time-domain and/or frequency-domain resource configuration used to send a system message or a paging message or an RACH response message and in the interference coordination message; or sending a system message or a paging message or an RACH response message on the resource according to an indication.

Further, the target node device may further include: a start symbol receiving module 203, configured to receive, from the source node device or the OAM, a start OFDM symbol of an ePDCCH of the source node device or a start OFDM symbol of an ePDCCH of the target node device. Furthermore, the interference coordination module 202 may perform interference coordination according to the start OFDM symbol of the ePDCCH of the source node device or the start OFDM symbol of the ePDCCH of the target node device, which is received by the start symbol receiving module 203, including determining an end OFDM symbol of a PDCCH of the target node device or a start OFDM symbol of the ePDCCH of the target node device according to the start OFDM symbol of the ePDCCH of the source node device or the start OFDM symbol of the ePDCCH of the target node device, so as to avoid causing interference to a PDCCH of the source node device or suffering interference from the PDCCH of the source node device.

In the embodiments of the present invention, by sending a multi-level priority configuration of a smaller resource of a source node device to a target node device, interference coordination is implemented with higher efficiency, and it is further ensured that a resource used to transmit a control channel is free from interference.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing disclosures are merely exemplary embodiments of the present invention and certainly are not intended to limit the scope of the claims of the present invention, a person of ordinary skill in the art may understand and implement all or a part of the procedures in the embodiments, and equivalent changes made according to the claims of the present invention shall still fall within the scope of the present invention.

What is claimed is:

1. An interference coordination method, the method comprising:
   generating, by a source node device, an interference coordination message indicating the interference coordination of a target node device, wherein the interference coordination message comprises a priority configuration indicating whether each resource of multiple resources of the source node device has a preset priority, and wherein the interference coordination message comprises a power configuration indicating whether transmit power of the each resource of the multiple resources of the source node device exceeds an threshold, wherein a resource of multiple resources having the preset priority is used to transmit a control channel or a control message; and
   sending, by the source node device, the interference coordination message to the target node device,
   wherein the each resource of the multiple resources is in an area shared by the control channel and a data channel.

2. The method according to claim 1, wherein the priority configuration and the power configuration are indicated by a plurality of bits of a bitmap in the interference coordination message.

3. The method according to claim 2, wherein the priority configuration and the power configuration are indicated by using one bitmap.

4. The method according to claim 1, wherein the power configuration comprises an indication identifying relative narrowband transmission power (RNTP).

5. The method according to claim 1, wherein the interference coordination message further comprises a configuration of a resource used to send a system message or a paging message or a random access channel response message.

6. The method according to claim 1, further comprising:
   sending, by the source node device, a start orthogonal frequency division multiplexing (OFDM) symbol of an extended physical downlink control channel (ePDCCH) of the source node device or the target node device to the target node device.

7. The method according to claim 1, wherein the each resource of the multiple resources comprises a partial physical resource block, and wherein the partial physical resource block comprises a part of one extended control channel (eCCE) or a part of an aggregation of at least two eCCEs.

8. A source node device for implementing interference coordination, the source node device comprising:
   at least one memory; and
   at least one processor communicatively coupled to the at least one memory, the at least one processor configured to:
      generate an interference coordination message indicating the interference coordination of a target node device, wherein the interference coordination message comprises a priority configuration indicating whether each resource of multiple resources of the source node device has a preset priority, and wherein the interference coordination message comprises a power configuration indicating whether transmit power of the each resource of the multiple resources of the source node device exceeds a threshold, wherein a resource of multiple resources having the preset priority is used to transmit a control channel or a control message; and
      send the interference coordination message to the target node device,
   wherein the each resource of the multiple resources is in an area shared by the control channel and a data channel.

9. The source node device according to claim 8, wherein the priority configuration and the power configuration are indicated by a plurality of bits of a bitmap in the interference coordination message.

10. The source node device according to claim 9, wherein the priority configuration and the power configuration are indicated by using one bitmap.

11. The source node device according to claim 8, wherein the power configuration comprises an indication identifying relative narrowband transmission power (RNTP).

12. The source node device according to claim 8, wherein the interference coordination message further comprises a configuration of a resource used to send a system message or a paging message or a random access channel response message.

13. The source node device according to claim 8, wherein the at least one processor is further configured to:
send a start orthogonal frequency division multiplexing (OFDM) symbol of an extended physical downlink control channel (ePDCCH) of the source node device or the target node device to the target node device.

14. The source node device according to claim 8, wherein the each resource of the multiple resources comprises a partial physical resource block, and wherein the partial physical resource block comprises a part of one extended control channel (eCCE) or a part of an aggregation of at least two eCCEs.

* * * * *